(12) United States Patent
Seedorf et al.

(10) Patent No.: US 9,805,122 B2
(45) Date of Patent: Oct. 31, 2017

(54) SEARCH ENGINE AND METHOD FOR PERFORMING A SEARCH FOR OBJECTS THAT CORRESPOND TO A SEARCH REQUEST

(75) Inventors: Jan Seedorf, Heidelberg (DE); Saverio Niccolini, Heidelberg (DE); Martin Stiemerling, Leimen (DE); Flavio Junqueira, Barcelona (ES); Marco Serafini, Barcelona (ES); Ivan Kelly, Barcelona (ES); Vincent Leroy, Barcelona (ES); Berkant Barla Cambazoglu, Barcelona (ES)

(73) Assignees: NEC EUROPE LTD., Heidelberg (DE); YAHOO HOLDINGS, INC., Sunnyvale, CA (US)

( * ) Notice: Subject to any disclaimer, the term of this patent is extended or adjusted under 35 U.S.C. 154(b) by 597 days.

(21) Appl. No.: 14/238,487

(22) PCT Filed: Aug. 12, 2011

(86) PCT No.: PCT/EP2011/004057
§ 371 (c)(1),
(2), (4) Date: Mar. 6, 2014

(87) PCT Pub. No.: WO2013/023667
PCT Pub. Date: Feb. 21, 2013

(65) Prior Publication Data
US 2014/0201184 A1    Jul. 17, 2014

(51) Int. Cl.
*G06F 17/30* (2006.01)

(52) U.S. Cl.
CPC .............................. *G06F 17/30864* (2013.01)

(58) Field of Classification Search
CPC ......... G06F 17/30864; G06F 17/30867; G06F 17/30011; G06F 17/30424; G06F 17/30554; G06F 17/30023
(Continued)

(56) References Cited

U.S. PATENT DOCUMENTS

| 8,688,775 B2 * | 4/2014 | Penno | ................... H04L 67/104 |
| | | | 709/201 |
| 9,154,551 B1 * | 10/2015 | Watson | ............... H04L 67/1014 |

(Continued)

OTHER PUBLICATIONS

International Search Report, dated Jun. 29, 2012, from corresponding PCT application.
(Continued)

*Primary Examiner* — Sheree Brown
(74) *Attorney, Agent, or Firm* — Young & Thompson

(57) ABSTRACT

A search engine for finding objects that correspond to a search request, including an input module for receiving a keyword query from a user, and a search module being configured to map the keyword query to the identifiers of objects that semantically match the keyword or the plurality of keywords contained in the keyword query, and to generate a search result that contains a listing of matching object identifiers, is characterized in that the search module is further configured to generate the search result by considering network layer information about the user within the process of mapping the keyword query to identifiers of matching objects, wherein the network layer information include sophisticated information the search module receives from a dedicated entity.

18 Claims, 4 Drawing Sheets

(58) Field of Classification Search
USPC .......................................................... 707/706
See application file for complete search history.

(56) References Cited

U.S. PATENT DOCUMENTS

| | | | | |
|---|---|---|---|---|
| 9,515,949 | B2* | 12/2016 | Richardson | ......... H04L 67/1097 |
| 9,525,659 | B1* | 12/2016 | Sonkin | ................ H04L 61/1511 |
| 9,608,957 | B2* | 3/2017 | Sivasubramanian | |
| | | | | ........................... H04L 61/1511 |
| 2007/0198495 | A1* | 8/2007 | Buron | ................. G06F 17/3087 |
| 2008/0045190 | A1* | 2/2008 | Ballou | ................ H04M 3/4938 |
| | | | | 455/414.2 |
| 2011/0295942 | A1* | 12/2011 | Raghunath | .............. H04L 45/00 |
| | | | | 709/203 |
| 2014/0215079 | A1* | 7/2014 | Penno | ................... H04L 67/104 |
| | | | | 709/226 |

OTHER PUBLICATIONS

Xiangyi Chen et al., "Rank Aggregation to Combine QoS in Web Search", Advances in Data and Web Management, Apr. 2, 2009, pp. 186-197.

J. Seedorf, "Application-Layer Traffic Optimization (ALTO) Problem Statement; rfc5693.txt", Internet Engineering Task Force, IETF, Oct. 1, 2009.

Hajime Kamiya et al., "An Improved Content Search Engine. Usage of Network Configuration Information", Tencon '98, IEEE Region 10 International Conference on Global Connectivity in Energy, Computer, Communication and Control, Dec. 1998.

* cited by examiner

SEARCH ENGINE AND METHOD FOR PERFORMING A SEARCH FOR OBJECTS THAT CORRESPOND TO A SEARCH REQUEST

BACKGROUND OF THE INVENTION

The present invention relates to a search engine for finding objects that correspond to a search request, comprising:
- an input module for receiving a keyword query from a user, and
- a search module being configured to map said keyword query to the identifiers of objects that semantically match the keyword or the plurality of keywords contained in said keyword query, and to generate a search result that contains a listing of matching object identifiers.

Furthermore, the present invention relates to a method for performing a search for objects that correspond to a search request, wherein
- an input module receives a keyword query from a user, and
- a search module maps said keyword query to the identifiers of objects that semantically match the keyword or the plurality of keywords contained in said keyword query, and generates a search result that contains a listing of matching object identifiers.

Search engines, in particular Internet search engines such as Yahoo, Google, etc., constantly face the situation where different objects or data items (e.g. a website, a YouTube video, a file . . . ), hereinafter briefly denoted "objects", may correspond, semantically, to a user keyword query. In these situations the search engine needs to decide which objects are of interest to the user and, based thereupon, which links to objects to display to the user as search results.

Further, search engines may face the situation where a desired object, which maps to a user's search request, is available at multiple locations in the network. Thus, the search engine needs to decide a) which objects (out of a multitude of objects which potentially contain— or map to— keywords from the query) it returns on top of the list of links to the user, and b) in the case there are multiple links to replicas of any particular object how to rank such replica links.

In order to be able to efficiently perform the above tasks, today's search engines have sophisticated algorithms to map keyword queries to objects. In addition, they use proprietary geo-location systems to determine the physical network location of the user who issued the query. Based on such systems, the search engine can optimize the semantic mapping from query to objects. For instance, the use of such geo-location systems enable the search engine for a search containing the keyword "SIDA" to return HIV info for a user in Spain (SIDA=Sindrome De Inmunodeficiencia Adquirida) but returning "Swedish International Development Cooperation Agency" for a user in Sweden.

However, even with the appliance of today's sophisticated algorithms, search results are often not optimally adapted to users' specific needs and to their current individual situation.

SUMMARY OF THE INVENTION

In view of the above it is therefore an object of the present invention to improve and further develop a search engine and a method for performing a search of the initially described type in such a way that the degree of "optimality" of objects included into a search result is improved.

In accordance with the invention, the aforementioned object is accomplished by a search engine comprising the features of claim 1. According to this claim, such a search engine is characterized in that said search module is further configured to generate the search result by considering network layer information about the user within the process of mapping said keyword query to identifiers of matching objects, wherein said network layer information include sophisticated information said search module receives from a dedicated entity.

Furthermore, the aforementioned object is accomplished by a method comprising the features of independent claim 17. According to this claim, such a method is characterized in that said search module generates the search result by considering network layer information about the user within the process of mapping said keyword query to identifiers of matching objects, wherein said network layer information include sophisticated information said search module receives from a dedicated entity.

According to the present invention it has been recognized that state-of-the-art solutions regarding the use of network layer information for optimizing query-to-object mapping provide merely a rough estimation of the optimal objects matching a user's query based on geo-location systems. Furthermore, it has been recognized that these solutions are not aware of operational policies of the network provider of the user, but that in particular these operational policies may in reality impact the optimal choice for an object to a large extent. To this end the present invention proposes to take sophisticated network layer information into account that a dedicated entity may provide about a user, when performing the keyword-to-object mapping. Particularly, the term "sophisticated network layer information" relates to kind of information which is normally intentionally provided to applications and services by a network operator or an Internet Service Provider of the user, and which the applications/services normally cannot measure themselves or obtain otherwise. Correspondingly, the dedicated entity may be any service that provides network layer information about hosts on the Internet which applications or services typically cannot easily measure or obtain otherwise by themselves.

By using network layer information as described above the present invention efficiently solves the aforementioned problem of determining the optimal object(s) that map to a certain keyword query by a search engine. It is an important aspect of the present invention that network layer information is considered already at the search engine level, i.e. in an object-location resolution step already. More specifically, the network layer information is specifically taken into account during the semantic mapping from a search request to an object identifier, i.e. within the semantic mapping algorithms of the search engine. As a result, the search results gained by the search engine to queries from the user are more adequate from the user and network operator perspective. Further, the search engine is enabled to reply to queries individually based on network layer information about the user's host, thereby achieving an optimal adaptation to the user's current situation and/or to his specific conditions.

According to a preferred embodiment the consideration of network layer information about the user may be performed according to predefined policies. For instance, these policies of how to take into consideration network layer information may be specified by the search engine service provider. In a specific embodiment, it may be provided that the search engine service provider investigates, in a first step, which kind of network layer information is actually available and can be retrieved, e.g. from one or more ALTO (Application Layer Traffic Optimization) servers, as described in more detail below. Based thereupon, in a second step, the search engine service provider may specify specific policies or a specific set of policies to be applied in the network layer information consideration process. For instance, policies may be specified in such a way that an optimization in terms of short reaction times is achieved. Alternatively, reducing costs for the user's network operator or an optimal adaptation to the user's device capabilities may be specified as most important issues. Depending on the specific situation, any combinations of policies may be realized.

In a specific embodiment of the invention the search module may be configured to consider network layer information about the user for the decision of which identifiers of matching object to be included into the search result. This means that the search engine takes into consideration network layer information about the user in order to decide what objects/data-items semantically match the query, i.e. to make a decision regarding the questions what does the user actually want and what the user is really interested in. For instance, in case that the network layer information about the user reveals an operational policy according to which certain traffic is blocked for the requesting IP address module, it may be provided that the search module does not include respective objects (which would, in principle, match the query) into the search result.

Additionally or alternatively, the search module may be configured to consider network layer information about the user for the decision of how to rank identifiers of matching object within the search result. In other words, the search module realizes a performance optimization in deciding what identifiers of matching objects to return with higher priority within the search result. For instance, in case that the network layer information about the user reveals that the user has a high download speed, it may be provided that object identifiers referring to videos are prioritized over object identifiers referring to images. It is to be noted that the ranking of matching objects may not only include a ranking as described above (which can be regarded as a first-level ranking), but may also include a ranking of object replicas that correspond to a certain object identifier (which can be regarded as a second-level ranking). In other words, this second-level ranking concerns the question of deciding what link (out of a multitude of links to replicas of the same object) to return with higher priority. For instance, it may be provided that only the "best" location (e.g. in terms of cost, speed, etc., depending on the applying policies) to retrieve a replica of a specific object identifier is included into the search result.

According to a preferred embodiment the network layer information may include information about the policies of the user's network operator, for instance dynamically changing routing policies or the like. This kind of information could be provided by the network operator itself, for instance, via an ALTO server hosted by the user's network operator. Is to be noted that network operators may have a business interest in providing the information since it may help them to reduce their costs. For example, as a result of the search engine considering the information for generating a search result the first hits in the search result may include links to objects that are located in the operator's own network, which would significantly reduce costly traffic for the network operator.

Furthermore, network layer information may include information about the user's geographical location and/or about network proximity between the user and another peer (e.g. the topological distance between two peers). Considering this kind of network relay information may particularly contribute to both cost reduction and reduced processing times for search result calculation.

Still further, the network layer information may include information about the user's provisioned capacity and/or download quotas, etc. Considering this kind of network layer information proves to be particularly useful from the user's point of view, since it may contribute to individualize the search result and to adapt it to this specific device capabilities and/or conditions of his contract/subscriptions with the network operator.

In a preferred embodiment the search module may include object identifiers of videos into the search result in case the considered network layer information reveal that the user has a high download speed or capacity, and wherein the search module includes object identifiers of images into the search result in case the considered network layer information reveal that the user has a low download speed or capacity. The specific thresholds of what is to be considered as high or low download speed or capacity may be defined in the search engine service provider's policies, either in a static fashion or dynamically adapted to the search result.

Advantageously, it may be provided that the search module retrieves network layer information about the user from one or more ALTO (Application Layer Traffic Optimization) servers. ALTO, which is a concrete example for a dedicated service for conveying network layer topology information, is a new concept for optimizing resource provider selection in distributed applications. In short, ALTO (described for instance in RFC 5693) is a dedicated service, operated by a network operator or ISP, which can provide useful network layer information to application layer clients about resource providers. As described in detail above, it is important to recall that in accordance with an embodiment of the present invention network layer information is considered already at the search engine level, thus in a previous object-location resolution step than compared to state-of-the-art ALTO usage.

The kind of information that is meaningful to convey to the search module via an out-of-band ALTO service may include any information that applications cannot easily obtain themselves and that changes on a much longer time scale than the instantaneous information used for congestion control on the transport layer. Examples for such information are operator's policies, geographical location or network proximity (e.g., the topological distance between two peers), the transmission costs associated with sending/receiving a certain amount of data to/from a peer, or the remaining amount of traffic allowed by a peer's operator (e.g., in case of quotas or limited flat-rate pricing models). However, as already mentioned above it is also possible that the search module retrieves the mentioned network layer information about the user from any other dedicated service for conveying network layer information about hosts on the Internet.

It is important to note that the application of the invention as described above may result in performance issues for the search engine because in general the user's network operator hosting an ALTO server (or any other network layer information provision entity) and the search engine service provider are different entities. If the search engine queries the particular ALTO server of the user's network operator for each search request, answer times may be too slow for users. Therefore, when taking network layer information, in particular ALTO information, into account at the search engine level, specific optimizations to speed up search responses may be performed, in particular pre-fetching and/or pre-processing of network layer information.

For instance, in a preferred embodiment the search module may have access to an ALTO server that hosts network layer information of a plurality of networks. To this end, the search engine service provider may set up its own ALTO server with global scope, i.e. hosting information for many networks. To provision this ALTO server with ALTO information, the search engine provider can either periodically pull ALTO information from network operators. This means that the search engine service provider actively pre-fetches ALTO information from network-operators. In other words, the search engine performs kind of crawling ALTO servers to build a local ALTO server at the search engine with global view. In another embodiment, the search engine may offer an interface for network operators to push ALTO information into its own ALTO server. It is to be noted that network operators have a clear incentive to use such a service because it can help to reduce costly traffic for them.

With respect to further speed up search engine responses, the search engine may include a control module that is configured to preprocess network layer information available to the search module, in particular by reducing the granularity of information. For instance, the search engine can reduce the granularity of ALTO information, e.g. by pre-processing and combining different ALTO network maps such that ALTO information corresponds to a /24 instead of a /29 subnet. Such preprocessing of ALTO-maps enables the search engine to employ sophisticatedly suited caching-techniques for optimizing search response times.

According to another preferred embodiment the search engine may include a storage module for caching network layer information. Caching of network layer information may be performed in addition to pre-fetching and pre-processing as described above. This enables to speed up response-time of the ALTO-server by having ALTO information for very frequent network locations cached locally.

With respect to an economic generation of the search result may be provided that the search engine is configured to first output a search result being computed by applying conventional algorithms and to perform an optimization of the search result in the background by considering network layer information, e.g. ALTO information. More specifically, this dynamic updating of displayed links with background optimization based on ALTO can be performed by carrying out the following steps:

At first, to enable the displaying of search results to users quickly, the search engine displays the results of its traditional/regular algorithms. At the same time, the search engine is optimizing results in the background via ALTO or, more generally, by considering network layer information. The search engine can then update the link list it displays dynamically (e.g. by employing AJAX technology). Further, the querying of ALTO information (independent of whether fetching ALTO information locally or remotely) can happen in parallel to when the search engine is computing text to be displayed under links (so called "snippets"), in case such "snippets" are being computed.

If ALTO is used to optimize the ranking of object replicas that correspond to a certain object identifier (objectID), the search engine may display the objectID list first, and as soon as a user moves his/her mouse over a certain link (detected via "mouse-over" by the search engine), the search engine uses ALTO information to compute the best location to retrieve a replica of this particular objectID from. This location is returned to the user when he/she clicks on the link of the objectID, i.e. when the user decided on a certain object. By employing such background usage of ALTO (triggered via mouse-over) a balance of performance needs of search engines with more optimized responses to queries via ALTO is achieved.

BRIEF DESCRIPTION OF THE DRAWINGS

There are several ways how to design and further develop the teaching of the present invention in an advantageous way. To this end, it is to be referred to the patent claims subordinate to patent claim 1 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1 schematically illustrates an application scenario of ALTO for performing DNS in a CDN according to prior art, FIG. 2 schematically illustrates an application scenario of ALTO for performing http redirect in a CDN according to prior art.

DETAILED DESCRIPTION OF THE PREFERRED EMBODIMENTS

While the following detailed description may describe example embodiments of the present invention in relation to Internet search engines (such as Yahoo or Google), the embodiments of the present invention are not limited thereto and, for example, can be implemented using other kinds of search engines where suitably applicable. In particular, the proposed invention is applicable to any kind of entity which maps query keywords (i.e. a query looking to find results for such keywords) to object identifiers.

Further, while example embodiments are described herein in relation to ALTO, the invention is not limited thereto and can be applied to other types of network layer information conveyance and/or provision systems where similar advantages may be obtained.

With state-of-the-art ALTO as described in RFC 5693, a dedicated entity hosted by each network operator on the Internet, i.e. an ALTO server for each operational domain, gives traffic guidance either directly to an application running on a user's host or to a third party. As third parties which can use ALTO information to indirectly help applications, proposals exist for P2P trackers or CDN caches. State-of-the-art ALTO proposals thus assume ALTO being used either by application clients themselves or by a resource directory (e.g. a P2P tracker or a Content Delivery Network, CDN).

Figure 1:
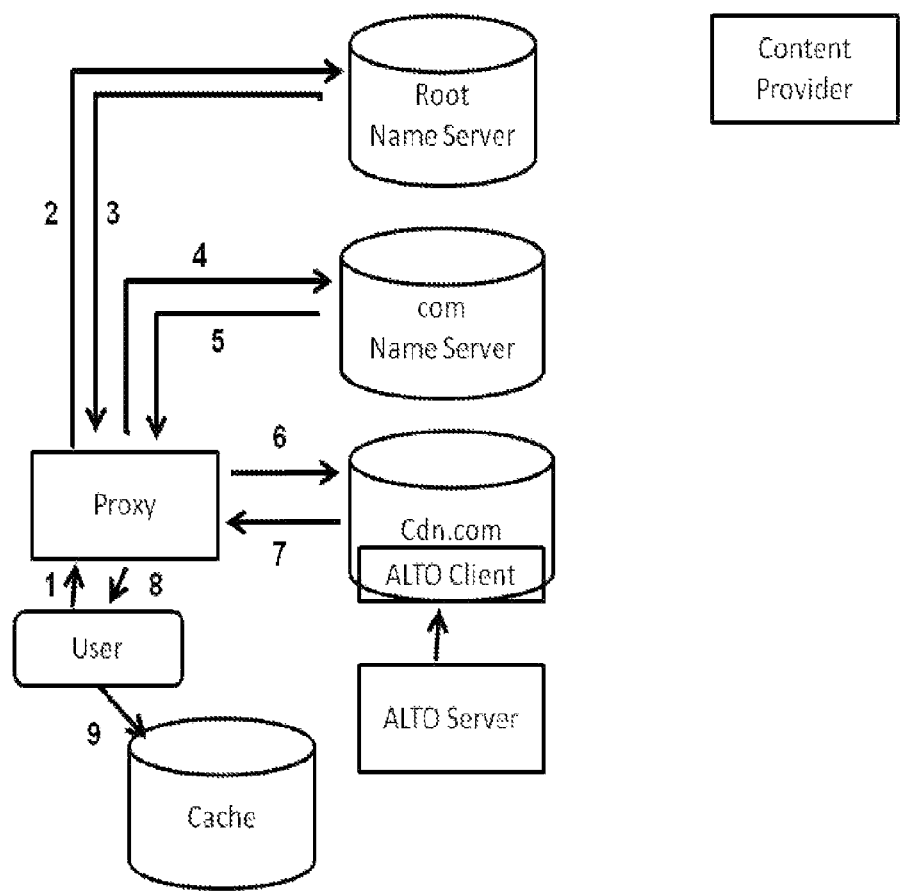
Figure 2:
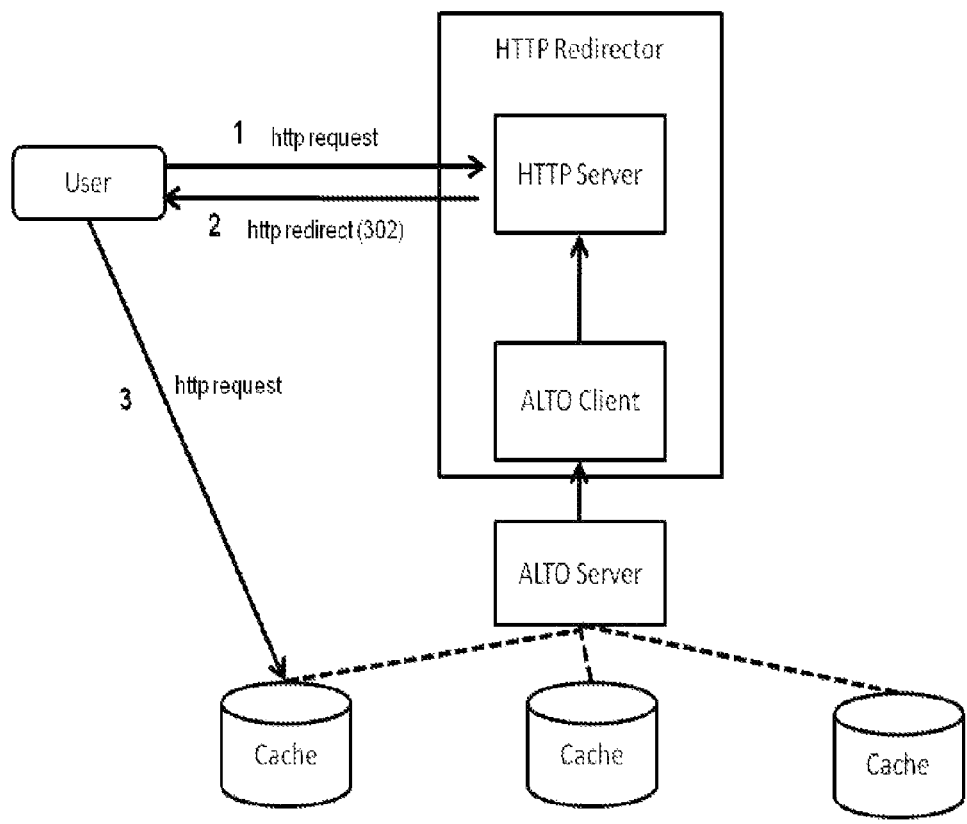

Referring now to FIGS. 1 and 2, state-of-the-art ALTO usages for CDNs (Content Delivery Networks) are described using DNS (Domain Name System) or http-redirect, respectively. As can been seen, the underlying assumption is that the user has already obtained a URL for the desired content in a previous step (which is not shown in FIGS. 1 and 2) when ALTO comes into play.

More specifically, with respect to FIG. 1, ALTO usage for CDNs using DNS will be illustrated, as described in R. Penno et al.: *draft-penno-alto-cdn*, http://tools.ietf.org/html/draft-penno-alto-cdn. In this document, with respect to DNS Request Routing, it is stated in section 4.2:

"DNS queries can be either iterative or recursive. Iterative queries can be used with ALTO if the host itself queries the DNS Servers, or if the DNS Proxy used by the host is topologically close to the host. If the Host directly queries the DNS Servers, the authoritative DNS Server can see directly the host's IP address. If the DNS Proxy is topologically close to the Host, its IP address is a good approximation for the host's location. In recursive queries, the authoritative DNS Server sees the IP address of the previous DNS Server in the resolution chain, and the IP address of the host is unknown. DNS-based request routing does not work well with recursive DNS queries.

In an iterative DNS lookup with DNS Proxy (say for cdn.com), the host queries the Proxy [illustrated in step 1 in FIG. 1], which in turn first queries one of the root servers [steps 2 and 3 in FIG. 1] to find the server authoritative for the top-level domain (com in our example). The Proxy then queries the obtained top-level-domain DNS server for the address of the DNS server authoritative for the CDN domain [steps 4 and 5 in FIG. 1]. Finally, the Proxy queries the DNS server that is authoritative for the cdn.com domain [step 6 in FIG. 1]. The authoritative DNS Server for the cdn.com will perform the request routing to the most appropriate CDN node, based on the source IP address of the requestor [step 7 in FIG. 1]. The host will then request the content directly from the CDN Node."

As further described in section 5.1.2 of the above document, in order to perform step 7 efficiently, i.e. in order to perform the request routing to the most appropriate CDN node, the authoritative DNS Server for the cdn.com includes an ALTO client which, via an ALTO protocol, contacts an ALTO Server that provides useful information, such as routing protocols, traffic engineering protocols, monitoring systems, etc.

In step 8, the DNS proxy returns the result of the authoritative DNS Server and in step 9, potentially, the User will store DNS results in a local cache.

FIG. 2 illustrates ALTO usage for CDNs using HTTP Redirect, as also described in the above mentioned document by R. Penno et al. In this document, with respect to HTTP Redirect, it is stated in section 4.1:

"In this mechanism, an HTTP GET request from a host [illustrated in step 1 in FIG. 2] is received by an HTTP Request Router which sends back an HTTP responses with Status-Code 302 (Redirect) [step 2 in FIG. 2] informing the host of the most optimal location to fetch the content. The HTTP Redirection method is already commonly used in production CDNs [ . . . ]. ALTO integration provides localization services where the device that performs the redirection becomes an ALTO client."

The user then re-sends the original http request to the new destination (received in the http redirect message), as illustrated in step 3 in FIG. 2.

Figure 3:
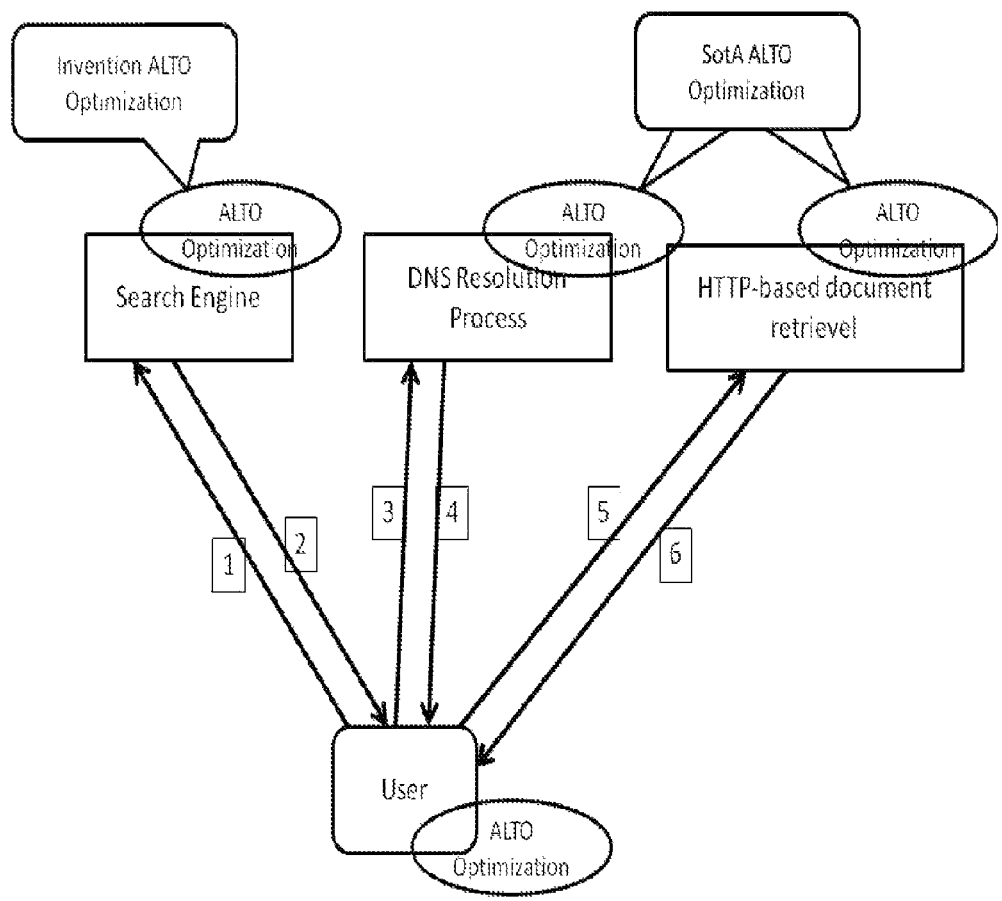
FIG. 3 is a high level view schematically illustrating the basic concept of the present invention, and FIG. 4 schematically illustrates a search process together with the related message flow using a search engine according to an embodiment of the present invention.

FIG. 3 is a high level view schematically illustrating the basic concept of the present invention compared to the state-of-the-art ALTO proposals described in connection with FIGS. 1 and 2. In contrast to prior art approaches, in accordance with the present invention ALTO optimization is already used at the stage of semantic "SearchQuery-to-URL" resolution (steps 1-2) instead of the stage of DNS resolution (steps 3-4) or http-based document retrieval (steps 5-6). In the described prior art solutions ALTO is being used by a resource directory (i.e. the CDN) which is already aware of the desired object identifier (e.g. a URL) which links to the desired object.

In contrast, the core idea of the illustrated embodiment of the present invention is to apply ALTO one step earlier in the overall user-request-to-download process: The idea is to already use ALTO at the stage of semantically mapping queries to object identifiers (e.g. URLs, but also any other kind of objectID which may have multiple replicas available on the Internet), i.e. directly returning to the user the optimal (based on ALTO) object links for each semantic match to a search query.

Figure 4:
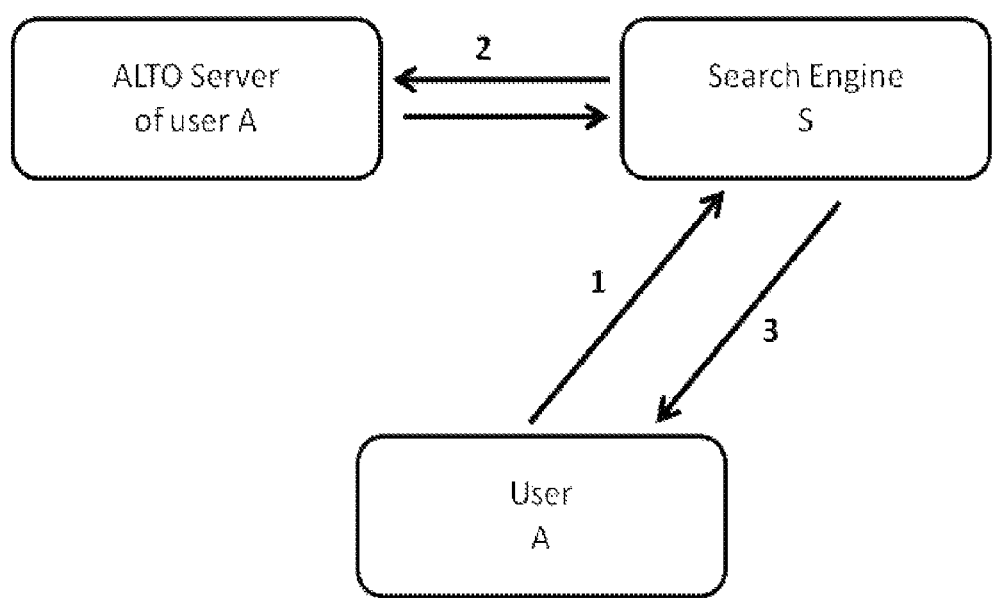

A basic embodiment of the present invention is illustrated in FIG. 4 and would be as follows:

In step 1 a user A queries a search engine S via its web browser. Next, is illustrated in step 2, search engine S queries the authoritative ALTO server for user A (e.g. the ALTO server hosted by A's ISP) to retrieve information about user A, e.g. A's download capacity. Specifically taking this information into account, the search engine S computes the list of links corresponding to user A's search request and displays it to the user A (as illustrated by step 3). For instance, A gives users with high download speed links to videos while it returns to GPRS users (i.e. users with low download speed) only links to images.

In the context of the described embodiment, the innovation lies in the fact that the search engine, when computing which data (or links to data) semantically match a search request, takes unique ALTO information into account in this step (i.e. in the mapping of a search request to a list of object-links). The term "unique" is to be understood in the sense that such information can only be obtained by an ALTO- or ALTO-like service.

Other examples of using network layer information in accordance with embodiments of the present invention, in particular ALTO, in the query-to-object mapping, which follow the same basic scheme as described in connection with FIG. 4, would be:

1. A mobile phone user A issues a query containing the query keyword "torrent". Via the authoritative ALTO server of the user A, the search engine S can obtain the operational policy that bittorrent traffic is blocked for the requesting IP-address. Thus, the search engine S displays links to .torrent files with lower priority on the link list it returns to the user A. One can imagine similar examples with other operational policies an ALTO server may convey.

2. An ALTO server can convey "the remaining amount of traffic allowed by a peer's operator (e.g., in case of quotas or limited flat-rate pricing models)", see for reference RFC 5693. In this case, the search engine S may query the ALTO server and based on the quota or flatrate-high-bandwidth-cap (e.g. as common today with mobile users, after 1 GB the traffic is throttled to GPRS speed), the search engine S may conclude that the user A is rather interested in, for instance, youtube videos, or rather pictures and text documents.

Specifically, an embodiment for using ALTO information in the context of a second-level ranking as described above, i.e. for ranking multiple replica links based on operator information, may include the following steps:

1. A user query is issued to the search site. The search site computes the top k best-matching documents for the query. In cases where at least one of the documents has multiple exact copies (replicas) stored at different locations, ALTO is used as follows.

2. The search site contacts the ALTO server and passes the IP addresses storing the duplicates for this document as well as the IP address of the user who issued the query.
3. The ALTO server returns estimates about the download speed, download cost for the user's ISP, or some other rating criterion, one per content location.
4. The search engine sorts the locations by the desired rating criterion (or a combination of several rating criteria). Only the "best" URL (e.g. the one with the fastest location) is displayed to the user. Optionally, it may be provided that the user can see all duplicates in sorted order by clicking on a "view all" button.

Finally, it is to be noted that in some situations, the application of the present invention may not be straightforward and may therefore require additional engineering. In particular, if a user is connected to a network via a VPN (Virtual Private Network), usually the user gets assigned an IP-address belonging to the IP-range of the domain of the VPN-gateway. Therefore, although the end-point of communication is actually located elsewhere, in such a case the search engine will obtain ALTO information corresponding to the VPN-assigned IP-address of the user, which in most cases does not correlate with the actual location of the user. How to solve this corner-case is outside the scope of the present invention. It is worth noting that this VPN-problem also persists with state-of-the-art proprietary geo-location systems used by search engines today. Thus, this is a general problem not unique to using network layer information for keyword-mapping optimization.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A search engine for finding objects that correspond to a search request, implemented on a server wherein a memory has stored therein processor code that, upon execution by a processor unit of the server, causes the server to operate as:
an input module that receives a keyword query from a user of the server; and
a search module configured to generate a mapping of said keyword query to object identifiers that semantically match one or more keywords contained in said keyword query, to generate a search result that contains a listing of matching object identifiers corresponding to said mapping, and to output said generated search result to the user,
wherein said search module, prior to outputting the search result, queries a dedicated network layer information server using information identifying the user, retrieves network layer information about the user from the network layer information server responsive to the query, and incorporates the retrieved network layer information about the user into the search result output to the user, said network layer information including sophisticated information that said search module receives from the network layer information server, the search module considering said retrieved network layer information about the user when semantically matching identifiers of objects with the keywords of the keyword query such that if one or more of the object identifiers in the generated search result are inconsistent with the retrieved network layer information about the user, said one or more inconsistent object identifiers are either of changed or omitted in the search result output to the user.

2. The search engine according to claim 1, wherein said consideration of network layer information about the user is performed according to predefined policies.

3. The search engine according to claim 1, wherein, in considering said retrieved network layer information about the user, said search module changes a rank identifier of at least one matching object identifier within the search result.

4. The search engine according to claim 1, wherein said retrieved network layer information include information about the policies of the user's network operator.

5. The search engine according to claim 1, wherein said retrieved network layer information include information about the user's geographical location and/or about network proximity between the user and another peer.

6. The search engine according to claim 1, wherein said retrieved network layer information include information about the user's provisioned capacity and/or download quotas.

7. The search engine according to claim 1, wherein, in considering said retrieved network layer information, in the event that said search module determines that the retrieved network layer information indicates that the user has a download speed lower than a predetermined threshold, the search module omits any matching object identifiers that are mapped to video content from the search result output to the user.

8. The search engine according to claim 1, wherein the network layer information server queried by said search module for retrieving network layer information about the user is one or more ALTO (Application Layer Traffic Optimization) servers.

9. The search engine according to claim 1, wherein said network layer information server is an ALTO server that hosts network layer information of a plurality of networks.

10. The search engine according to claim 9, wherein said ALTO server includes a mechanism for the search engine provider to pull network layer information from network operators.

11. The search engine according to claim 9, wherein said ALTO server includes an interface for network operators to push network layer information.

12. The search engine according to claim 1, including a control module that is configured to preprocess network layer information available to said search module by reducing a granularity of information.

13. The search engine according to claim 1, including a storage module for caching network layer information retrieved from the network layer information server.

14. The search engine according to claim 1, configured to output a search result based on the mapping of the keyword query to the object identifiers that semantically match the keywords contained in the keyword query, and to perform, as a background process, said considering of said network layer information such that said search result output to the user is dynamically updated in accordance with said network layer information.

15. The search engine according to claim 1, wherein upon detection of a "mouse-over" event on a matching object identifier in the search result output to the user, corresponding network layer information retrieved from the network layer information server is used by the search module to compute a best location for retrieving a replica of the matching object identifier.

16. A method for performing a search for objects that correspond to a search request, carried out on a server having a memory that has stored therein processor code for operating a CPU of the server to cause the server to carry out the steps of the method, the method comprising:

receiving, via an input module implemented by the processor code operating on the server, a keyword query from a user; and generating a mapping, via a search module implemented by the processor code operating on the server, of said keyword query to the object identifiers that semantically match one or more keywords contained in said keyword query, generating a search result that contains a listing of matching object identifiers corresponding to said mapping, and outputting said generated search result to the user, wherein said search module, prior to outputting the search result, queries a dedicated network layer information server using information identifying the user, retrieves network layer information about the user from the network layer information server responsive to the query, and incorporates the retrieved network layer information about the user within the mapping of said keyword query to identifiers of matching objects, wherein said network layer information including sophisticated information that said search module receives from the network layer information server, the search module considering said retrieved network layer information about the user when the search module semantically matches identifiers of objects with the keywords of the keyword query, such that if one or more of the object identifiers in the generated search result are inconsistent with the retrieved network layer information about the user, said one or more inconsistent object identifiers are either of changed or omitted in the search result output to the user.

17. The search engine according to claim 2, wherein, in considering said retrieved network layer information about the user, said search module changes a rank identifier of at least one matching object identifier within the search result.

18. A search engine for finding objects that correspond to a search request, comprising:

an ALTO (Application Layer Traffic Optimization) server provided with a memory with processor code stored therein that, upon execution by a processor unit of the server, causes the server to operate as:

an input module that receives a keyword query from a user of the server; and a search module configured to generate a mapping of said keyword query to object identifiers that semantically match one or more keywords contained in said keyword query, to generate a search result that contains a listing of matching object identifiers corresponding to said mapping, and to output said generated search result to the user, wherein said search module, prior to outputting the search result, queries a dedicated network layer information server using information identifying the user, retrieves network layer information about the user from the network layer information server responsive to the query, and incorporates the retrieved network layer information about the user into the search result output to the user, said network layer information including sophisticated information that said search module receives from the network layer information server, the search module using said retrieved network layer information about the user as part of semantically matching identifiers of objects with the keywords of the keyword query, such that if one or more of the object identifiers in the generated search result are inconsistent with the retrieved network layer information about the user, said one or more inconsistent object identifiers are either of changed or omitted in the search result output to the user.

* * * * *